Jan. 15, 1952     E. M. NELSON     2,582,716
TRAILER CASTER
Filed Nov. 3, 1948
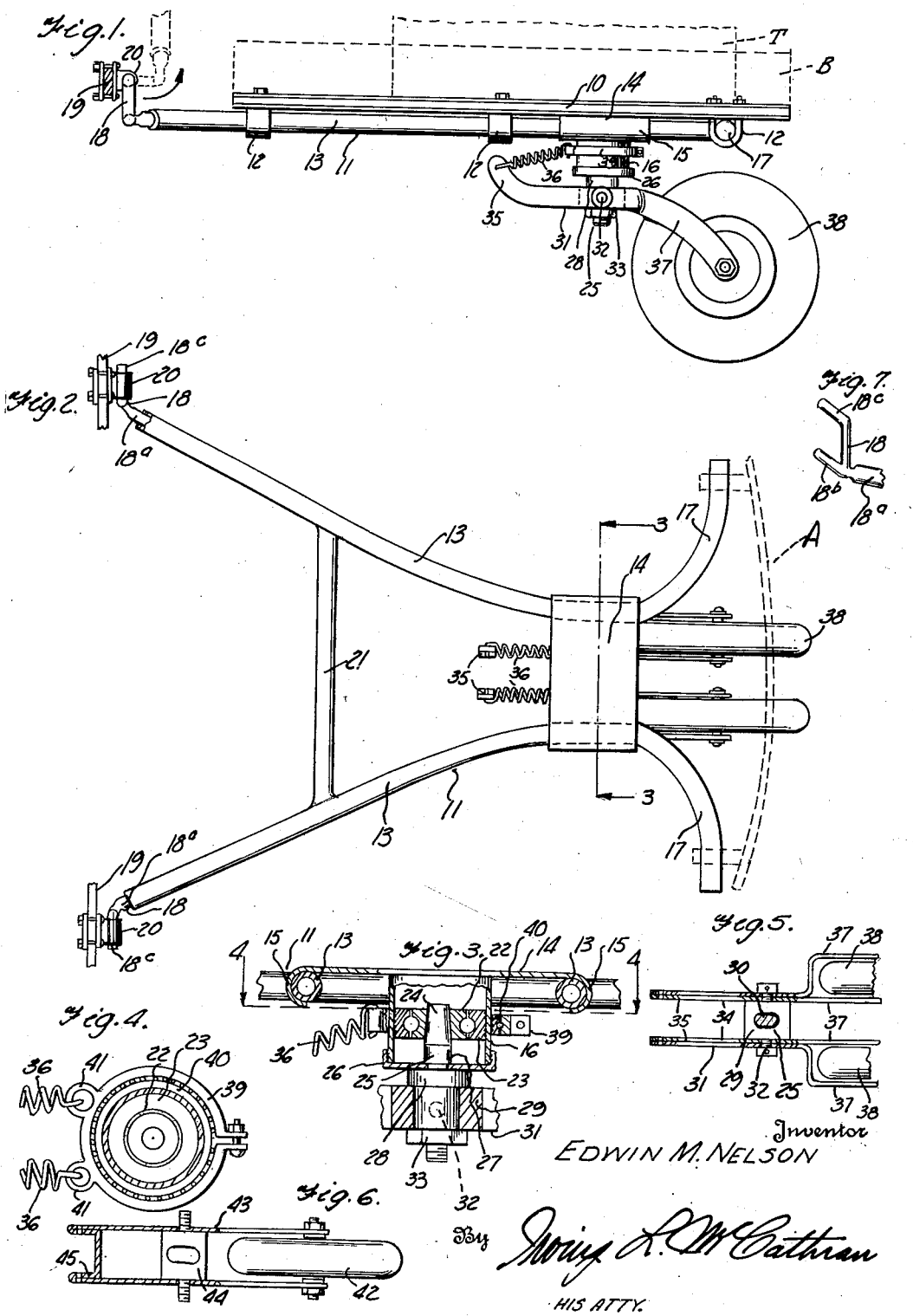
Inventor
EDWIN M. NELSON Patented Jan. 15, 1952

2,582,716

UNITED STATES PATENT OFFICE 2,582,716

TRAILER CASTER

Edwin M. Nelson, Hayward, Wis.

Application November 3, 1948, Serial No. 58,103

2 Claims. (Cl. 16—44)

This invention relates to casters, particularly adapted for use upon trailers, and has for one of its objects the production of a simple and efficient caster for stabilizing the trailer and facilitating the parking of the trailer.

A further object of this invention is the production of a simple and efficient caster and journal therefor which may be easily attached to a trailer frame.

Other objects and advantages of this invention will appear throughout the following specification and claims.

In the drawing:

Figure 1 is a side elevational view of the trailer;

Figure 2 is a top plan view of the trailer frame and dual supporting wheels;

Figure 3 is an enlarged transverse sectional view taken on line 3—3 of Figure 2;

Figure 4 is a horizontal sectional view taken on line 4—4 of Figure 3;

Figure 5 is a longitudinal fragmentary sectional view of the dual wheel supporting frame, certain parts being shown in elevation; and Figure 6 is a longitudinal sectional view of a modified form showing a single wheel supporting frame;

Figure 7 is a perspective view of the two-step hitch.

By referring to the drawing, it will be seen that 10 designates a conventional floor-board upon which may be carried a trunk T and a conventional box B. The floor-board 10 is supported upon the frame 11 and secured thereto by suitable U-shaped fasteners 12 which encircle the side rails 13 of the frame 11. The side rails 13 converge rearwardly where they are engaged by the hanger plate 14, the hanger plate 14 having hooked side edges 15 which partly encircle the tubular side rails 13, as shown in Figure 3 to anchor the plate 14 thereto, and to hold the rails against lateral spreading. The plate 14 spans the rails 13 and a king pin supporting casing 16 is suspended centrally from the plate 14 between the rails 13. The rails 13 are provided with laterally diverging ends 17, as shown in Figure 2, to which may be secured a conventional bumper A shown in dotted lines. The platform 10 is secured to the rails 13 at spaced intervals by the fasteners 12, the rear fastener preferably engaging the laterally diverging ends 17.

The forward end of each rail 13 carries a two-step hitch 18 which is adapted to be secured to the outside of a towing car bumper 19 by means of a suitable clamp 20, the two-step hitch 18 providing an offset hinge connection to permit the trailer to be swung upwardly to the dotted position in the direction of the arrow shown in Figure 1, when parking, if desired to conserve space. The side rails 13 are preferably braced by means of a transverse spanning brace 21 shown in Figure 2.

The depending casing 16 carries a bearing assembly 22, one ring 23 thereof being fixed in any desired manner to the inner face of the casing 16 as shown in Figure 3. This bearing assembly 22 of a conventional type receives the upper tapering end 24 of the king pin 25. The lower end of the casing 16 is closed by a suitable threaded cap 26 through which the king pin 25 extends, and is provided with a shoulder 27 which rests upon the closure cap 26. A spacing collar 28 engages the bottom of the cap 26 and rests upon the pivoted king pin supporting block 29. The king pin 25 is oval in cross section, as at 30, where the pin 25 passes through the block 29. The block 29 is pivotally secured horizontally to the dual wheel supporting yoke 31 by means of the lateral supporting shafts 32 which may be held in place in any desired manner to hingedly connect the yoke 31 to the king pin supporting block 29. A nut 33 holds the block 29 in place upon the lower end of the king pin 25.

The two-step hitch 18 comprises a shank 18a which fits into the end of its supporting rail 13 as shown in Figure 2. This hitch 18 comprises a lower clamp engaging step finger 18b and an upper vertically offset step finger 18c which extends parallel to the step finger 18b. The two-step hitch 18 provides an efficient means for attaching the trailer to a towing vehicle and provides means for shifting the connection with the towing vehicle from the lower step finger 18b to the upper step finger 18c, and vice versa, depending on the weight of the load on the trailer. This will minimize the danger of load shifting and will facilitate the support of the trailer in as near a true horizontal plane as may be required.

The yoke 31 comprises a pair of forwardly extending relatively short parallel arms 34 which are provided with upturned ends 35 for engaging the stabilizing springs 36. The yoke 31 is also provided with rearwardly extending relatively long parallel downwardly turned wheel supporting arms 37 for engaging the dual wheels 38 of a wheel assembly.

A bearing ring assembly 39 is fixed to the exterior of the casing 16 by having the inner bearing ring 40 anchored in any desired manner thereto. The ring assembly 39 is provided with radially spaced eyes 41 to which the inner ends of the stabilizing springs 36 are secured, The operation of the invention is as follows:

As the caster wheels 38 of the trailer pass over rough ground, the stabilizing springs 36 will constitute shock absorbers and will take up a major part of the shock or unstabilized motion of the trailer which otherwise might result when passing over rough terrain. The springs 36 will yield and tend to provide smooth travel for the trailer reducing bumps and shocks to a minimum. At the same time the journaling of the king pin 25 as shown, and the hinging of the yoke 34 to the block 29 will permit the wheels 38 to easily follow the towing vehicle.

If desired, the trailer may be swung upwardly from a horizontal position to a substantially vertical position against the rear of the towing vehicle because of the step hitches 18 and connection thereof with the towing vehicle by means of the clamps 20. This is particularly advantageous when parking in areas restricted as to size, and when it is necessary to conserve space. It should be understood that a very simple and efficient structure has been provided comprising a minimum number of parts firmly secured together in a manner to reduce rattling to a minimum.

In Figure 6 there is shown a modified form of the wheel engaging yoke for engaging a single wheel 42. This yoke 43 preferably comprises a pair of parallel arms between the rear ends of which is journalled the wheel 42. A block 44 similar to the block 29 is journalled intermediate the ends of the arms 43 and the forward ends of the arms are connected by an integral connecting U-shaped bridge 45 to which the springs 36 may be secured. This single wheel yoke 43 may replace the dual yoke 31 when it is desired.

It should be understood that certain detail changes in mechanical structure may be provided without departing from the spirit of the invention so long as these changes fall within the scope of the appended claims.

Having described the invention, what is claimed is:

1. A caster of the class described comprising a hanger plate, a king pin supporting casing suspended from said plate, a king pin journalled in said casing, a yoke secured to said king pin and horizontally hinged to said king pin in vertical alignment with the central vertical axis of said king pin to provide a vertically aligned rockable support for said yoke, said yoke having a rearwardly extending portion, a supporting wheel carried by said rearwardly extending portion, said yoke having a forwardly extending end, a rotatable bearing assembly connected to said casing, and yieldable stabilizing means connecting said forwardly extending end to said bearing assembly.

2. A caster of the class described comprising a hanger plate, a king pin supporting casing suspended from said plate, a king pin journalled in said casing, a yoke secured to said king pin and horizontally hinged to said king pin in vertical alignment with the central vertical axis of said king pin to provide a vertically aligned rockable support for said yoke, said yoke having a rearwardly extending portion, a supporting wheel carried by said rearwardly extending portion, said yoke having a forwardly extending end, a rotatable bearing assembly connected to said casing, said bearing assembly being carried exteriorly of said casing, laterally spaced eyes carried by said bearing assembly, and a stabilizing spring engaging each eye and also engaging the forwardly extending end of said yoke.

EDWIN M. NELSON.

REFERENCES CITED

The following references are of record in the file of this patent:

UNITED STATES PATENTS

| Number | Name | Date |
| --- | --- | --- |
| 2,080,709 | Hall et al. | May 18, 1937 |
| 2,163,850 | Pfister | June 27, 1939 |
| 2,174,465 | Jedlicka | Sept. 26, 1939 |
| 2,187,136 | Mellinger | Jan. 16, 1940 |
| 2,198,270 | Maranville | Apr. 23, 1940 |
| 2,227,875 | Boden | Jan. 7, 1941 |
| 2,282,506 | Wachter | May 12, 1942 |
| 2,410,570 | Davis | Nov. 5, 1946 |